United States Patent
Gora et al.

(10) Patent No.: US 11,531,085 B2
(45) Date of Patent: Dec. 20, 2022

(54) ON-CHIP NOISE REDUCTION AND POWER CONSUMPTION DISTRIBUTION FOR A RADAR SYSTEM

(71) Applicant: Infineon Technologies AG, Neubiberg (DE)

(72) Inventors: Witold Gora, Unterhaching (DE); Ljudmil Anastasov, Munich (DE); Thomas Langschwert, Kirchheim (DE); Bejoy Mathews, Oberhaching (DE)

(73) Assignee: Infineon Technologies AG, Neubiberg (DE)

( * ) Notice: Subject to any disclaimer, the term of this patent is extended or adjusted under 35 U.S.C. 154(b) by 464 days.

(21) Appl. No.: 16/409,001

(22) Filed: May 10, 2019

(65) Prior Publication Data
US 2020/0355791 A1    Nov. 12, 2020

(51) Int. Cl.
*G01S 7/28* (2006.01)
*G01S 7/282* (2006.01)

(52) U.S. Cl.
CPC ............ *G01S 7/2813* (2013.01); *G01S 7/282* (2013.01)

(58) Field of Classification Search
CPC ...... G01S 13/931; G01S 13/87; G01S 13/343; G01S 13/42; G01S 7/352; G01S 7/356; G01S 7/023; G01S 7/40; G01S 7/4021; G01S 7/4008; G01S 7/2813; G01S 7/282; G01S 7/038; G01S 7/354; G01S 13/584; G01S 13/345

See application file for complete search history.

(56) References Cited

U.S. PATENT DOCUMENTS

| | | | | |
|---|---|---|---|---|
| 6,014,100 A * | 1/2000 | Fehrenbach | .......... | G01F 23/284 342/124 |
| 2004/0140926 A1 * | 7/2004 | Nakamura | ............ | G01S 7/4017 342/175 |
| 2014/0313069 A1 * | 10/2014 | Tseng | ...................... | G01S 7/032 342/175 |
| 2018/0115409 A1 * | 4/2018 | Nayyar | ................. | G01S 13/343 |
| 2019/0056476 A1 * | 2/2019 | Lin | ........................ | G01S 13/343 |
| 2019/0187272 A1 * | 6/2019 | Nemeth | ................ | G01S 13/931 |
| 2020/0264278 A1 * | 8/2020 | Eckert | ..................... | G01S 7/003 |

* cited by examiner

*Primary Examiner* — Olumide Ajibade Akonai
(74) *Attorney, Agent, or Firm* — Harrity & Harrity, LLP (57) ABSTRACT

A radar system may include a set of analog components to perform one or more radio frequency (RF) operations during an active radar phase of the radar system. The radar system may include a set of digital components to perform one or more digital processing operations during at least a digital processing phase of the radar system. The one or more digital processing operations may be performed such that performance of the one or more digital processing operations does not overlap performance of a substantive portion of the one or more RF operations.

21 Claims, 6 Drawing Sheets

ON-CHIP NOISE REDUCTION AND POWER CONSUMPTION DISTRIBUTION FOR A RADAR SYSTEM

BACKGROUND

A radar system may include a set of analog components designed to operate at radio frequency (RF) at a wavelength in, for example, a millimeter range (e.g., from approximately 70 gigahertz (GHz) to approximately 80 GHz). The set of analog components may be configured to perform RF operations associated with the radar system, such as transmitting a radar signal, receiving a radar signal, sampling a received radar signal, storing sampled radar signal data, and/or the like. The radar system may also include a set of digital components configured to perform digital operations associated with the radar system, such as digital signal processing of stored radar signal data, communicating a digital communication including processed data, and/or the like.

SUMMARY

According to some implementations, a radar system may include a set of analog components to perform one or more radio frequency (RF) operations during an active radar phase of the radar system; and a set of digital components to perform one or more digital processing operations during at least a digital processing phase of the radar system, wherein the one or more digital processing operations are performed such that performance of the one or more digital processing operations does not overlap performance of a substantive portion of the one or more RF operations.

According to some implementations, a radar system may include a set of analog components to perform one or more RF operations during operation of the radar system, wherein power to the set of analog components is supplied by a first power supply during performance of the one or more RF operations, wherein a second power supply of the radar system is deactivated during the performance of the one or more RF operations; and a set of digital components to perform one or more digital processing operations during the operation of the radar system, wherein power to the set of digital components is supplied by the second power supply during performance of the one or more digital processing operations, wherein a noise power of the second power supply is higher than a noise power of the first power supply.

According to some implementations, a method may include storing, by a radar system and based on sampling a radar signal, first data in a first memory component of a plurality of memory components of the radar system, wherein the first memory component is operating in an active power state during the storing of the first data in the first memory component, and wherein a second memory component, of the plurality of memory components, is operating in a low power state during the storing of the first data in the first memory component; and storing, by the radar system and based on sampling the radar signal, second data in the second memory component, wherein the second memory component is in the active power state during the storing of the second data in the second memory component, and wherein the first memory component is in the low power state during the storing of the second data in the second memory component.

DETAILED DESCRIPTION

The following detailed description of example implementations refers to the accompanying drawings. The same reference numbers in different drawings may identify the same or similar elements.

As described above, a radar system may include a set of analog components (e.g., a radar integrated circuit, one or more RF circuits, a low-noise analog memory, one or more analog to digital convertors (ADCs) and/or the like) associated with performing RF operations, and a set of digital components (e.g., one or more digital signal processor (DSPs), a microcontroller, a digital interface, a digital memory, and/or the like) associated with performing digital operations. In some radar system applications, such as an automotive application, a need for both high performance and miniaturization of a radar system is ever increasing. However, the need for both increasingly high performance and increasingly miniaturized systems imposes technological challenges. For example, performance can be improved by including more powerful and/or faster digital components, and miniaturization can be improved by integrating analog components and digital components (e.g., on a single chip, in a single package, and/or the like). However, a number of issues arise when integrating such high-performance digital components with analog components.

One such issue is due to noise generated in the digital domain of the radar system. For example, typically at least some of the set of analog components of a radar system are highly sensitive to noise. Therefore, these components are adversely affected by noise produced during digital processing and/or noise from a power supply of the radar system (e.g., a high efficiency power supply, such as a direct current to direct current (DC-DC) converter). Further, the radar system may be mounted in a covered location that provides limited, costly, and/or complex options for protection and/or isolation from electromagnetic interference (EMI). Additionally, peaks in power consumption can lead to voltage drops, which can result in further signal disturbances.

Another challenge is related to heat generated by the radar system. For example, when a low noise power supply is used, power consumption of the radar system increases (e.g., since a low noise power supply is less power efficient than a high efficiency power supply). This additional power consumption results in excess heat being generated by the integrated radar system chip. As noted above, the radar system may be mounted in a covered location, which can also limit desirable options for ventilation. Further, any peaks in power consumption can lead to voltage drops and produce additional thermal stress on the radar system chip.

A number of prior solutions exist for mitigating these challenges. Such prior solutions include: use of low power semiconductor technology, use of high temperature capable semiconductor technology, use of specialized chip packaging, implementation of a chip cooling system, use of a multi-chip solution (for problem domain separation), use of power optimized DSP algorithms, and use of power management by voltage scaling. However, these prior solutions are undesirable due to the increased cost and complexity imparted by implementation.

Some implementations described herein provide an improved radar system capable of on-chip noise reduction and reduced power consumption. In some implementations, the improved radar system may include a set of analog components capable of performing one or more RF operations, and a set of digital components capable of performing one or more digital processing operations. In some implementations, as described in further detail below, the improved radar system is configured such that the one or more digital processing operations are performed without overlapping performance of a substantive portion of the one or more RF operations. Preventing the one or more digital processing operations from overlapping the substantive portion of the one or more RF operations prevents noise generated in the digital domain from adversely impacting the one or more RF operations in the RF domain and, as a result, improves performance of a single chip radar system.

In some implementations, as described in further detail below, power to the set of analog components is supplied by a low noise power supply during performance of the one or more RF operations. Here, a high efficiency power supply (e.g., with comparatively higher noise power than the low noise power supply, such as a power supply with an efficiency of at least approximately 0.75) of the improved radar system may be deactivated during the performance of the one or more RF operations. However, power to the set of digital components may be supplied by the high efficiency power supply during performance of the one or more digital processing operations. As a result of this power supply switching between different phases of radar operation, noise experienced by the set of analog components is reduced during the performance of the RF operations (e.g., since the low noise power supply is used for operations in the RF domain while the high efficiency power supply is deactivated). Further, an amount of power consumed by the improved radar system and an amount of heat generated by the improved radar system are reduced (e.g., since the high efficiency power supply is used for operations in the digital domain, rather than the low noise power supply).

In some implementations, as described in further detail below, power consumption can be further reduced by causing one or more memory components to operate in a low power state (e.g., when not in use for memory retention) or an active power state (e.g., when data is being read or written). For example, a memory of the improved radar system (e.g., a memory in the digital domain) may include multiple memory components. Here, a given memory component may operate in an active power state while data is being stored in the given memory component (e.g., during storing of radar signal data in the given memory component), while one or more other memory components may operate in a low power state while the data is being stored in the given memory component (i.e., while the one or more other memory components are not being accessed). After the storing of the data in the given memory component is complete, the given memory component may operate in the low power state (i.e., may switch from the active power state to the low power state), and another one of the other memory components may operate in the active power state (i.e., may switch from the low power state to the active power state) in association with storing data. This process can be repeated as the improved radar system stores data in each memory component. Here, operation of at least some of the memory components in the low power state reduces overall power consumption and, therefore, heat generated by the improved radar system.

The separation of RF activity and digital processing activity in the power domain, as described herein, enables coexistence and interoperability of components of a radar system that, by their nature, would otherwise interfere with each other. For example, the separation of the RF activity and the digital activity facilitates noise reduction regardless of an amount of noise generated in the digital domain by digital processing component and, therefore, there need not be a limitation on computing power of a digital signal processors, current consumption, area, and so on. As another example, the separation of RF activity and digital processing activity enables the possibility to use a high efficiency component (e.g., a DC-DC converter) for power supply generation in the digital domain (e.g., in order to improve power consumption characteristics of the radar system), without adversely impacting RF domain operations. Notably, the implementations described herein support this general principle of separation of RF and digital activity (which can be referred to as "time slicing"). However, the implementations described herein are provided merely as examples, and this general principle can be achieved using a variety of technical means.

Figure 1A:
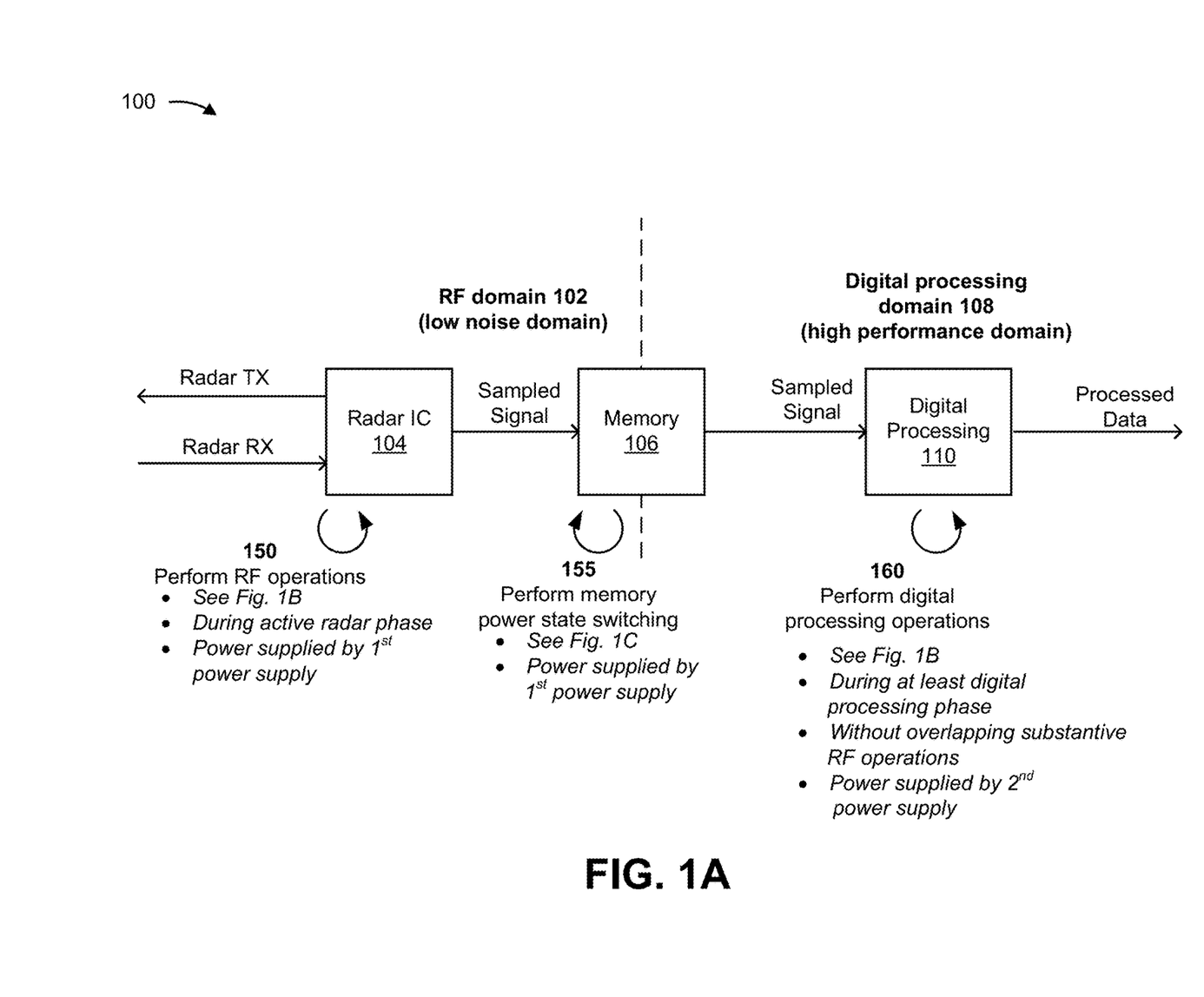
FIGS. 1A-1C are diagrams associated with an example implementation of an improved radar system, as described herein.
Figure 1B:
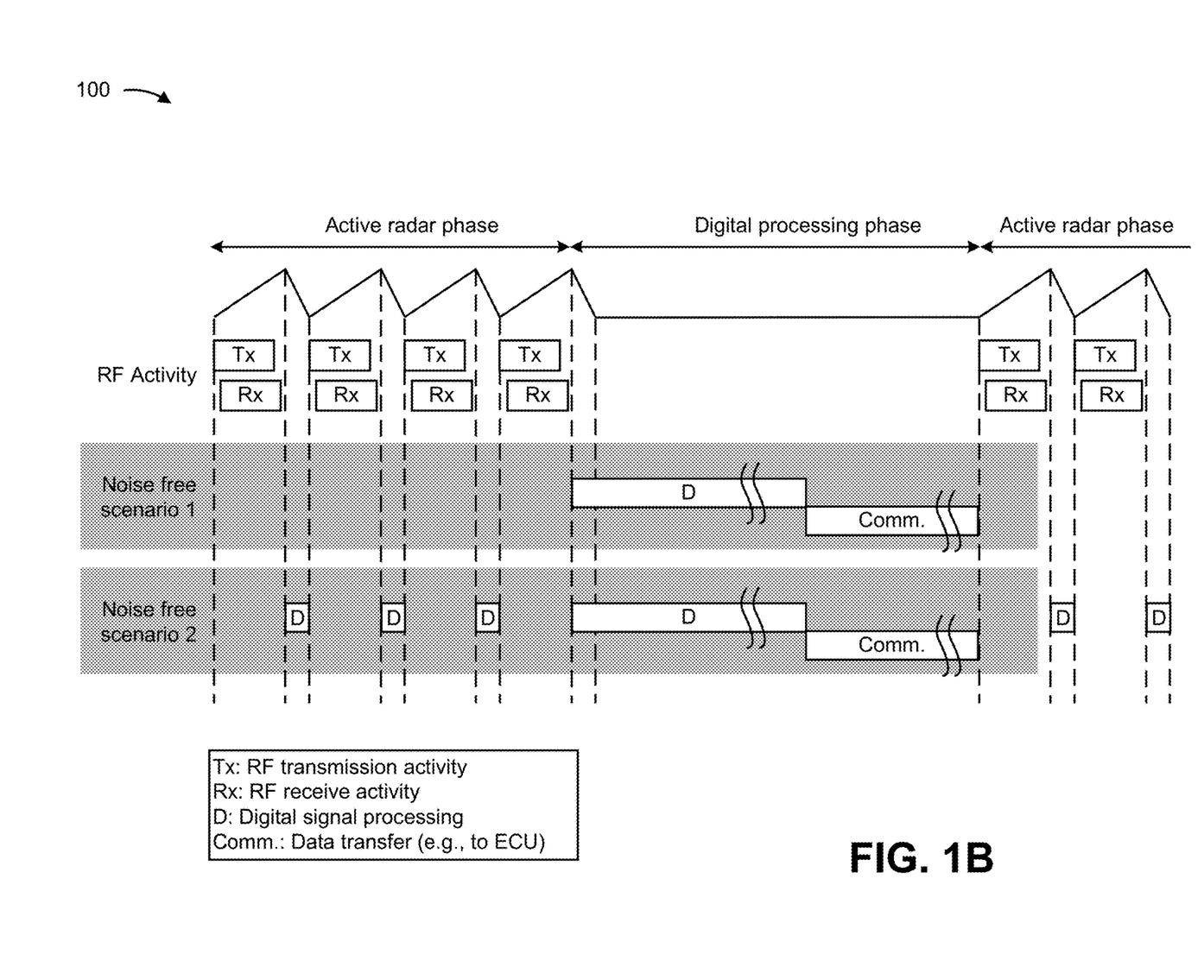
Figure 1C:
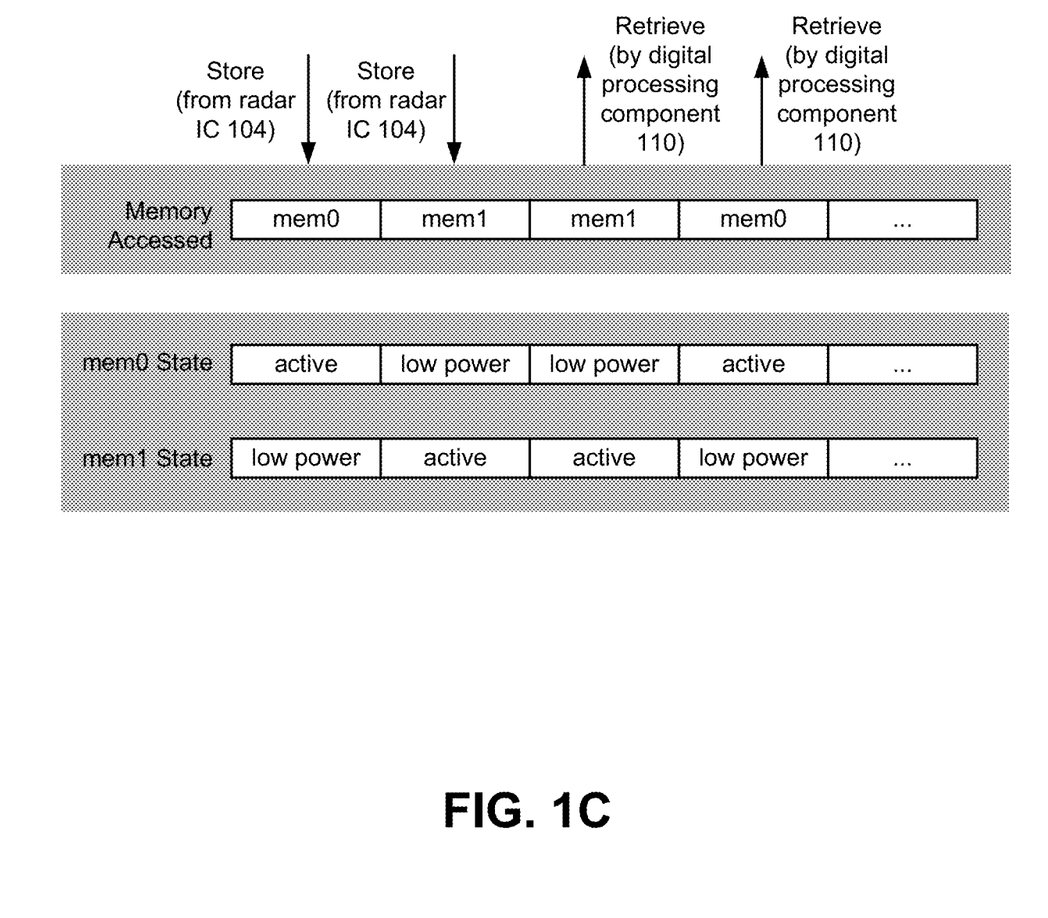

FIGS. 1A-1C are diagrams associated with an example implementation of an improved radar system described herein (herein referred to as radar system 100). As shown in FIG. 1A, radar system 100 may include an RF domain 102 including a radar integrated circuit (IC) 104. As further shown, radar system 100 may include a digital processing domain 108 including a digital processing component 110. As shown, a memory 106 may be included in RF domain 102 and/or digital processing domain 108. In some implementations, the components of radar system 100 may be integrated (e.g., on a single chip, in a single package, and/or the like), or may be included in a multi-chip radar system (e.g., on different chips in a same package, on different chips in different packages, and/or the like). Components of radar system 100 may interconnect via wired connections, wireless connections, or a combination of wired and wireless connections. Details of the components of radar system 100 are provided below, followed by examples associated with operation of radar system 100.

RF domain 102 of radar system 100 includes a set of analog components associated with performing one or more RF operations. In some implementations, as described below, the one or more RF operations may be performed during an active radar phase of radar system 100. The active radar phase of radar system 100 is a phase of operation during which radar IC 104 and/or an analog memory of memory 106 perform one or more RF operations associated with RF domain 102. Such operations may include, for example, transmitting a radar signal, receiving the radar signal, sampling the received radar signal, storing sampled radar signal data in the analog memory of memory 106, transferring the stored sampled radar signal data from the analog memory to a digital memory of memory 106, and/or the like. As shown in FIG. 1A, radar IC 104 and a portion of memory 106 (e.g., an analog memory of memory 106) may be included in RF domain 102 of radar system 100. In some implementations, one or more components included in RF domain 102 (e.g., radar IC 104 and/or memory 106) may include or be connected to a low noise power supply (e.g., such that power to memory 106 can be supplied by the low noise power supply during performance of the one or more RF operations).

Radar IC 104 includes a component capable of transmitting a radar signal, receiving the radar signal, sampling the received radar signal (in order to determine radar signal data), providing radar signal data for storage (e.g., in memory 106), and/or performing one or more other RF operations associated with radar system 100. For example, radar IC 104 may include a monolithic microwave IC (MMIC) that operates at a microwave frequency (e.g., between approximately 30 GHz and approximately 300 GHz) in association with transmitting, receiving, and/or sampling a radar signal. In some implementations, radar IC 104 may include one or more ADCs associated with converting analog signals to digital signals. In some implementations, radar IC 104 may include or be connected to a low noise power supply (e.g., such that power to radar IC 104 can be supplied by the low noise power supply during performance of the one or more RF operations by radar IC 104).

Memory 106 includes a set of memory components (e.g., an analog memory, a digital memory, and/or the like) capable of receiving sampled radar signal data (e.g., from radar IC 104), storing the sampled radar signal data, and/or providing the stored radar signal data. For example, memory 106 may include a read only memory (ROM) (e.g., an EEPROM), a random access memory (RAM), and/or another type of dynamic or static storage device (e.g., a flash memory, a magnetic memory, an optical memory, etc.). In some implementations, memory 106 may include an analog memory that can be used to temporarily store radar signal data during the performance of the one or more RF operations. In some implementations, the analog memory 106 of memory 106 may be included in RF domain 102. Further, in some implementations, memory 106 may include a digital memory that can be used to store radar signal data, received from the analog memory of memory 106, such that digital processing component 110 can perform one or more digital processing operations based on the radar signal data. In some implementations, the digital memory of memory 106 may be included in RF domain 102 and/or digital processing domain 108. In some implementations, the analog memory and the digital memory can be integrated in a single memory device or can be separate in separate memory devices. In some implementations, memory 106 may include or be connected to a low noise power supply (e.g., such that power to the analog memory of memory 106 and the digital memory of memory 106 can be supplied by the low noise power supply, as described elsewhere herein). In some implementations, use of the low noise power supply to power memory 106 provides noise reduction during operation of radar system 100, as described herein. In some implementations, memory 106 may include or be connected to a high efficiency power supply (e.g., such that power to the digital memory of memory 106 can be supplied by the high efficiency power supply, as described elsewhere herein).

In some implementations, as described below, one or more memory components of memory 106, such as components of the digital memory of memory 106, may be caused to operate in an active power state or to operate in a low power state. The active power state is a power state that allows radar signal data (e.g., determined by radar IC 104 based on sampling a received radar signal) to be stored in (e.g., written to) the memory component or retrieved from (e.g., read-out from) the memory component. The low power state is a power state in which the memory component is powered off (e.g., when no data is stored in the memory component) or a power state in which the memory component is powered in order to retain data stored therein (e.g., after data has been stored in the memory component), for example, without allowing access to the stored data.

Digital processing domain 108 includes digital processing component 110 associated with performing one or more digital processing operations. In some implementations, as described below, the digital processing operations may be performed during at least a digital processing phase of radar system 100. The digital processing phase of radar system 100 is a phase of operation during which digital processing component 110 performs one or more digital activities associated with digital processing domain 108. In some implementations, one or more components included in digital processing domain 108 (e.g., digital processing component 110, a digital memory of memory 106) may include or be connected to a high efficiency power supply (e.g., such that power can be supplied by the high efficiency power supply during performance of the one or more digital processing operations).

Digital processing component 110 includes a set of digital components to perform one or more digital activities during operation of radar system 100. For example, digital processing component 110 may include one or more digital signal processors (DSPs) (e.g., connected to memory 106, connected to one or more components of RF domain 102, and/or the like), a microcontroller, a digital interface (e.g., via which radar system 100 may receive and/or provide information from and/or to another device or system), and/or the like.

In some implementations, digital processing component 110 may perform one or more digital activities during operation of radar system 100. The digital activities can include, for example, one or more digital signal processing and/or digital communication operations (herein referred to as digital processing operations) associated with radar signal data stored in memory 106. The one or more digital processing operations may include, for example, one or more operations associated with an algorithm configured on radar system 100 (e.g., an algorithm associated with determining a distance, a velocity, an acceleration, a direction of arrival, and/or the like), one or more operations associated with detecting an object, one or more operations associated with tracking an object, one or more operations associated with communicating (e.g., transmitting or receiving) a digital communication, and/or the like. Generally, the one or more digital processing operations include digital activities with relatively high throughput and/or that generate relatively high noise (e.g., FFT operations) when performed by digital processing component 110. Notably, the one or more digital processing operations may not include some digital activities, such as storing of a digital signal, and/or the like.

In operation, and as indicated by reference number 150 in FIG. 1A, radar IC 104 and/or memory 106 may perform one or more RF operations. For example, as shown, radar IC 104 may transmit a radar signal and receive the radar signal (e.g., after reflection of the radar signal from one or more objects). As further shown, radar IC 104 may sample the received radar signal, provide the sampled radar signal data to memory 106. Here, the sampled radar signal data may be temporarily stored in the analog memory of memory 106 before being transferred (e.g., between ramps associated with transmitting and receiving the radar signal) to the digital memory 106 of memory 106. As noted by reference number 150, the one or more RF operations may be performed during an active radar phase of radar system 100. As further noted, one or more components in RF domain 102 (e.g., radar IC 104 and the analog memory of memory 106)

and/or one or more components in digital processing domain 108 (e.g., the digital memory of memory 106) may be supplied by a first power supply during performance of the one or more RF operations. In some implementations, the digital memory of memory 106 may be supplied by the first power supply in order to support only data retention only. In some implementations, the first power supply may be a linear power supply (e.g., a low dropout voltage regulator) or another type of low noise power supply. Additional details regarding performance of the one or more RF operations are described below in association with FIG. 1B.

As indicted by reference number 155, in some implementations, power state switching, associated with memory 106, may be performed as the sampled radar signal data is stored in memory components of memory 106 (e.g., such that, at a given time, only a particular memory component of the digital memory that is currently being accessed is in an active power state, while other memory components of the digital memory are in a low power state). Additional details regarding power state switching of memory components of memory 106 are described below with respect to FIG. 1C.

As indicated by reference number 160, digital processing component 110 may perform one or more digital activities, including one or more digital processing operations. For example, as shown, digital processing component 110 may retrieve stored radar signal data from memory 106 (e.g., from the digital memory of memory 106) process the digital data, and transmit the processed data (e.g., to another device or system). As noted by reference number 160, one or more digital processing operations performed by digital processing component 110 may be performed during at least a digital processing phase of radar system 100. As further noted, one or more components in digital processing domain 108 (e.g., the digital memory of memory 106, digital processing component 110, and/or the like) may be supplied by a second power supply during performance of the one or more digital processing operations. In some implementations, the second power supply may be a switched mode power supply (e.g., a DC-DC converter) or another type of high efficiency power supply. In some implementations, a noise power of the second power supply may be higher than a noise power of the first power supply. Additional details regarding performance of the one or more digital processing operations are described below in association with FIG. 1B.

In some implementations, digital processing component 110 may perform the one or more digital processing operations such that performance of the one or more digital processing operations does not overlap performance of a substantive portion of the one or more RF operations in the time domain. As used herein, the substantive portion of the one or more RF operations is defined as a portion of the one or more RF operations that is to define digital signals (e.g., after conversion of the radar signal data to digital data) that are to be processed during the performance of the one or more digital processing operations. In other words, the substantive portion of the one or more RF operations is a portion of the one or more RF operations that result in radar signal data that will be used in association with the one or more digital processing operations (e.g., radar signal data that will be used as input to an algorithm, in association with detecting an object, in association with tracking an object, in association with communicating a digital communication, and/or the like).

FIG. 1B is a diagram illustrating examples of operational sequencing that may be implemented in order to cause the one or more digital processing operations to be performed such that performance of the one or more digital processing operations does not overlap performance of a substantive portion of the one or more RF operations.

The top row in FIG. 1B illustrates performance of the one or more RF operations (by components in RF domain 102). As shown, the one or more RF operations (e.g., radar signal transmission activity, radar signal receipt activity (including radar signal sampling and radar signal data storage)) may be performed during a given active radar phase. In some implementations, as indicated in FIG. 1B, the active radar phase may correspond to an entire sequence or frame of operation in the radar frequency (e.g., a sequence of chirps). Different example scenarios for performance of the one or more digital processing operations are illustrated in the shaded rows (identified as "Noise free scenario 1" and "Noise free scenario 2").

In some implementations, performance of the one or more digital processing operations does not overlap performance of the substantive portion of the one or more RF operations by causing the one or more digital processing operations to not be performed during the entirety of the active radar phase. Such an implementation is illustrated by "Noise free scenario 1." As shown, in such a case, the one or more digital processing operations, namely digital signal processing and digital communication (i.e., data transfer), are performed entirely in the digital processing phase. More particularly, as illustrated in FIG. 1B, an analog component in the RF domain 102 (e.g., radar IC 104) transmits and receives radar signal patterns and stores (e.g., in memory 106) the received radar signal data. As shown, one or more components in digital processing domain 108 (e.g., digital processing component 110) are inactive during the active radar phase. In some implementations, unused components of radar system 100 (e.g., digital processing component 110) are temporarily not clocked (or kept in a low activity mode, minimizing noise) and a low noise power supply provides power (e.g., to enable data retention only). Next, during the digital processing phase, the one or more analog components in RF domain 102 are inactive, and the one or more digital components in digital processing domain 108 become active, retrieve the radar signal data (e.g., from memory 106), and process the radar signal data. As further shown, the processed data is then communicated (e.g., via a digital interface). In some implementations, when becoming active, the power supply for the digital components may be switched to a high efficiency (high power) power supply (e.g., in order to fulfill power demand during the digital processing phase). As indicated in FIG. 1B, this cycle can be performed repeatedly in accordance with the application specific radar operation scheme.

In some implementations, performance of the one or more digital processing operations does not overlap performance of the substantive portion of the one or more RF operations by causing the one or more digital processing operations to be at least partially performed during non-substantive portions of the active radar phase (e.g., portions of the active radar phase in which RF signals are processed that do not correspond to data to be processed in association with the one or more digital processing operations). Such an implementation is illustrated by "Noise free scenario 2." As shown, in such a case, the one or more digital processing operations are at least partially performed during the active radar phase (e.g., between chirps). Notably, the partial performance of the one or more digital processing operations does not introduce noise to substantive portions of the one or more RF operations (e.g., since the one or more digital processing operations are not performed during, for example, transmission or reception of the radar signal). In some implementations, interleaving the one or more digital processing operations with RF activity in the manner illustrated by "Noise free scenario 2" may reduce a latency associated with digital processing and/or improve utilization of radar system 100.

In some implementations, as described above, components in RF domain 102 and/or digital processing domain 108 may be supplied by a first power supply (e.g., a linear power supply, such as a low dropout voltage regulator or another type of low noise power supply) during performance of the one or more RF operations. Here, a second power supply (e.g., a switched mode power supply, such as a DC-DC converter or another type of high efficiency/high power power supply) of radar system 100 may be deactivated (e.g., powered off, operating in a low noise mode, operating in a low activity mode, and/or the like) during the performance of the one or more RF operations. Conversely, components in digital processing domain 108 may be supplied by the second power supply during performance of the one or more digital processing operations.

In general, a noise power of the second power supply (i.e., the power supply that supplies power to the digital components during the performance of the one or more digital processing operations) may be higher than a noise power of the first power supply (i.e., the power supply that supplies power to the analog components during the performance of the one or more RF operations). Thus, by causing the second power supply to be deactivated during the performance of the one or more RF operations, a noise effect on sampled radar signal data is reduced. In some implementations, the first and second power supply may be a same power supply that is capable of selectively operating in a low noise mode or a high efficiency mode. In some implementations, the set of digital components may be powered by the first power supply during the performance of the one or more RF operations by the set of analog components. Additionally, or alternatively, the set of analog components may be powered by the second power supply during the performance of the one or more digital processing operations by the set of digital components.

As illustrated by the above examples, the use of operational sequencing (e.g., as illustrated in the examples of FIG. 1B) prevents noise associated with the one or more digital processing operations (e.g., noise generated during performance of the one or more digital processing operations, noise from the high efficiency power supply, and/or the like) from impacting operation of the set of analog elements during the performance of the one or more RF operations. Additionally, the use of operational sequencing allows noise reduction measures to be implemented in radar system 100 (e.g., since the low noise power supply may be used to power the one or more analog components and the one or more digital components during the active radar phase). Further, the use of operational sequencing allows power saving/heat reduction measures to be implemented in radar system 100. For example, since a comparatively more efficient power supply may power the one or more digital components during the performance of the one or more digital processing operations, power consumption and heat generation may be reduced (e.g., as compared to powering the one or more digital components using a low noise/less efficient power supply).

In some implementations, power state switching, associated with memory 106, may be performed as the sampled radar signal data is stored in memory components of memory 106. Because radar signal data is acquired and processed sequentially, memory 106 may be accessed in a deterministic fashion. This characteristic can be leveraged in order to reduce power consumption of radar system 100. For example, since access to memory components of the digital memory of memory 106 is deterministic, a memory component of the digital memory that is in use (e.g., a memory buffer that is being written to or read from) may operate in an active power state. In this example, memory components of memory 106 other than that currently being used (e.g., memory buffers that are not being written to or ready from at the given time) may operate in a low power state (e.g., powered off, a power mode that enables data retention only, and/or the like). In some implementations, the active power state is a power state that allows radar signal data (e.g., determined by radar IC 104 based on sampling a received radar signal) to be stored in (e.g., written to) the memory component or retrieved from (e.g., read-out from) the memory component. In some implementations, the low power state is a power state in which the memory component is powered off (e.g., when no data is stored in the memory component) or a power state in which the memory component is powered in order to retain data stored therein (e.g., after data has been stored in the memory component), for example, without allowing access to the stored data.

FIG. 1C is a diagram illustrating an example of power state switching associated with memory 106. In the example shown in FIG. 1C, memory 106 is partitioned into memory component mem0 and memory component mem1. In operation, as illustrated in FIG. 1C, radar IC 104 may (e.g., during an active radar phase) first access memory component mem0 (e.g., a first memory component of the digital memory of memory 106) in order to store a first radar signal data in memory component mem0. As shown, during access by radar IC 104, memory component mem0 may operate in the active power state (e.g., since memory component mem0 is being accessed), and memory component mem1 (e.g., a second memory component of the digital memory of memory 106) may operate in the low power state (e.g., since memory component mem1 is not being accessed). As further shown, after the first radar signal data is stored in memory component mem0, memory component mem1 may switch to the active power state (e.g., since memory component mem1 is to be accessed next), and memory component mem0 may switch to the low power state (e.g., since memory component mem0 needs to only retain the first radar signal data). As shown, memory component mem1 may (e.g., during the active radar phase) operate in the active power state during access by radar IC 104 (e.g., in order to allow second radar signal data to be stored in memory component mem1).

For the purposes of this example, the active radar phase is completed after radar IC 104 stores the second radar data in memory component mem1, and the second radar signal data and the first radar sequence data are to be read out and processed in the digital domain. As further shown, in order to permit read-out of the second radar signal data (e.g., by digital processing component 110 during the digital processing phase), memory component mem1 may remain in the active power state, while memory component mem0 may remain in the low power state (e.g., since memory component mem0 is not yet being accessed and needs to only retain the first radar signal data). As further shown, after the second radar signal data is retrieved from memory component mem1, memory component mem1 may switch to the low power state, and memory component mem0 may switch to the active power state (e.g., in order to allow the first radar signal data to be retrieved by digital processing component 110).

Notably, the example shown in FIG. 1C is a simple example provided for illustrative purposes, and can be applied to a memory 106 including any number of memory components (e.g., a memory 106 comprising thousands or tens of thousands of memory buffers). For example, during the storing of the first radar signal data in memory component mem0 and the storing of the second radar signal data in memory component mem1, a memory component mem2 (not shown) may operate in the low power state. Here, during storing of third radar signal data in memory component mem2, memory component mem0 and memory component mem1 may operate in the low power state. In some implementations, the power state switching technique described above may reduce power consumed by radar system 100 and/or heat generated by radar system 100 (e.g., since an amount of power consumed in association with powering memory 106 may be reduced due to operating at least some components of memory 106 in a low power state).

As indicated above, FIGS. 1A-1C are provided merely as one or more examples. Other examples may differ from what is described with regard to FIGS. 1A-C. Further, the number and arrangement of components shown in FIGS. 1A-1C are provided as examples. In practice, there may be additional components, fewer components, different components, or differently arranged components than those shown in FIGS. 1A-1C. Furthermore, two or more components associated with FIGS. 1A-1C may be implemented within a single component, or a single component shown in association with FIGS. 1A-1C may be implemented as multiple, distributed components. Additionally, or alternatively, a set of components (e.g., one or more components) of radar system 100 may perform one or more functions described as being performed by another set of components of radar system 100.

Figure 2:
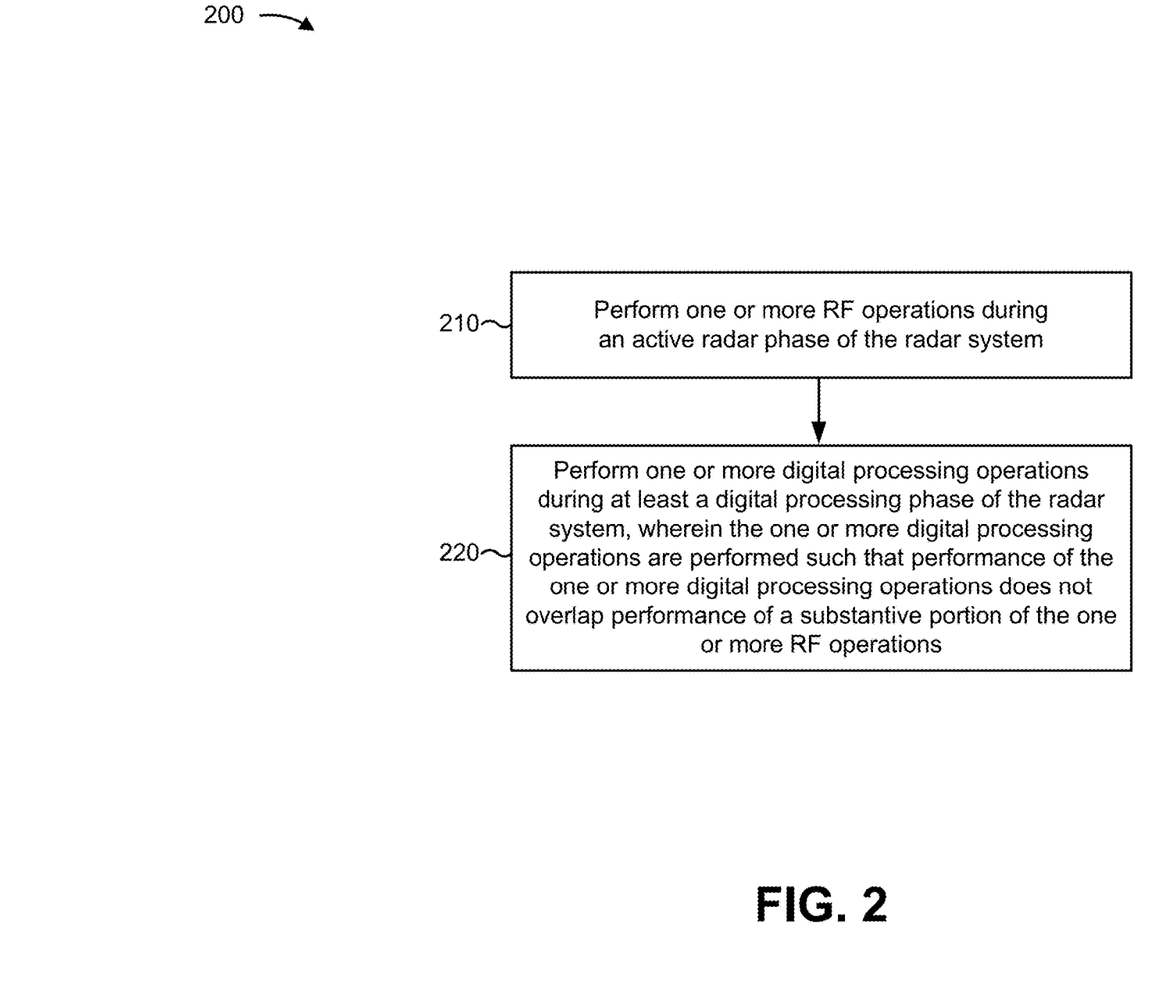
FIG. 2 is a flow chart of an example process associated with operational sequencing for an improved radar system.

FIG. 2 is a flow chart of an example process 200 associated with operational sequencing for an improved radar system, as described herein. In some implementations, one or more process blocks of FIG. 2 may be performed by one or more components of a radar system (e.g., radar system 100).

As shown in FIG. 2, process 200 may include performing one or more RF operations during an active radar phase of the radar system (block 210). For example, the radar system (e.g., using a set of analog components, such as radar IC 104, memory 106, and/or one or more other components in RF domain 102) may perform one or more RF operations during an active radar phase of the radar system, as described above.

As further shown in FIG. 2, process 200 may include performing one or more digital processing operations during at least a digital processing phase of the radar system (block 220). For example, the radar system (e.g., using a set of digital components, such as digital processing component 110 and/or one or more other components in digital processing domain 108) may perform one or more digital processing operations during at least a digital processing phase of the radar system, as described above. In some implementations, the one or more digital processing operations are performed such that performance of the one or more digital processing operations does not overlap performance of a substantive portion of the one or more RF operations.

Process 200 may include additional implementations, such as any single implementation or any combination of implementations described below and/or in connection with one or more other processes described elsewhere herein.

In some implementations, the one or more digital processing operations are not performed during the entirety of the active radar phase.

In some implementations, the one or more digital processing operations are at least partially performed during portions of the active radar phase in which RF signals are processed that do not correspond to data processed by the one or more digital processing operations.

In some implementations, the radar system is a single chip system.

In some implementations, the set of analog components is supplied by a first power supply during performance of the one or more RF operations. Here, a second power supply of the radar system is powered off during the performance of the one or more RF operations, and a noise power of the second power supply is higher than a noise power of the first power supply. In some implementations, power to the set of digital components is supplied by the second power supply during performance of the one or more digital processing operations.

In some implementations, the one or more digital processing operations include an operation associated with at least one of: an algorithm associated with determining a distance, an algorithm associated with determining a velocity, an algorithm associated with determining an acceleration, an algorithm associated with determining a direction of arrival, detecting an object, tracking an object, or communicating (e.g., transmitting or receiving) a digital communication.

In some implementations, the substantive portion of the one or more RF operations is a portion of the one or more RF operations that includes digital signals that are to be processed during the performance of the one or more digital processing operations.

Although FIG. 2 shows example blocks of process 200, in some implementations, process 200 may include additional blocks, fewer blocks, different blocks, or differently arranged blocks than those depicted in FIG. 2. Additionally, or alternatively, two or more of the blocks of process 200 may be performed in parallel.

Figure 3:
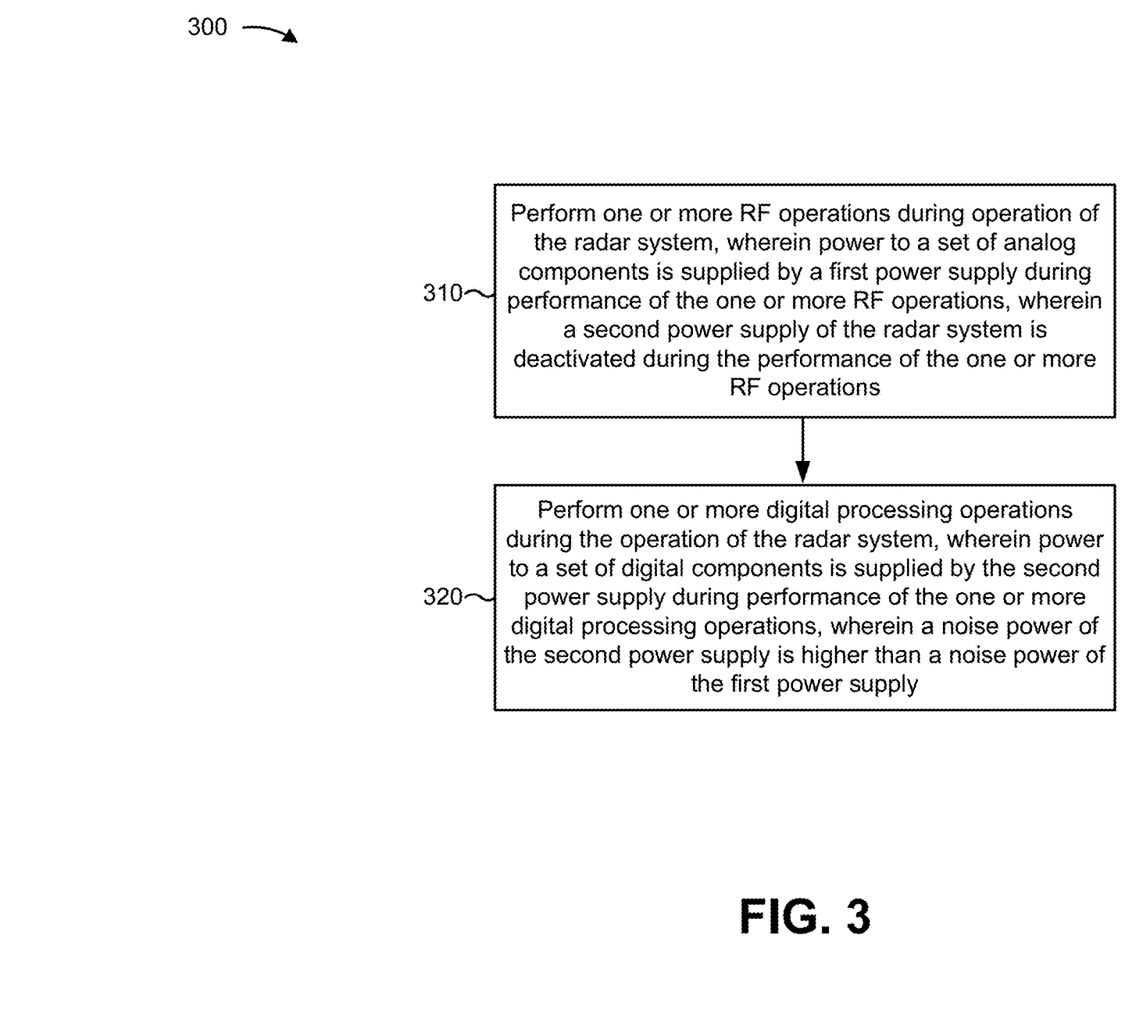
FIG. 3 is a flow chart of an example process associated with power supply switching for an improved radar system.

FIG. 3 is a flow chart of an example process 300 associated with power supply switching for an improved radar system. In some implementations, one or more process blocks of FIG. 3 may be performed by one or more components of a radar system (e.g., radar system 100).

As shown in FIG. 3, process 300 may include performing one or more RF operations during operation of the radar system (block 310). For example, the radar system (e.g., using a set of analog components, such as radar IC 104, memory 106, and/or one or more components in RF domain 102) may perform one or more RF operations during operation of the radar system, as described above. In some implementations, power to the set of analog components is supplied by a first power supply during performance of the one or more RF operations. In some implementations, a second power supply of the radar system is deactivated during the performance of the one or more RF operations.

As further shown in FIG. 3, process 300 may include performing one or more digital processing operations during the operation of the radar system (block 320). For example, the radar system (e.g., using a set of digital components, such as digital processing component 110 and/or one or more other components in digital processing domain 108) may perform one or more digital processing operations during the operation of the radar system, as described above. In some implementations, power to the set of digital components is supplied by the second power supply during performance of the one or more digital processing operations. In some implementations, a noise power of the second power supply is higher than a noise power of the first power supply.

Process 300 may include additional implementations, such as any single implementation or any combination of implementations described below and/or in connection with one or more other processes described elsewhere herein.

In some implementations, the set of digital components is powered by the first power supply during the performance of the one or more RF operations by the set of analog components.

In some implementations, the set of analog components is powered by the second power supply during the performance of the one or more digital processing operations by the set of digital components.

In some implementations, the first power supply is a linear power supply. In some implementations, the second power supply is a switched mode power supply.

In some implementations, the one or more RF operations are performed during an active radar phase of the radar system, and the one or more digital processing operations are performed during at least a digital processing phase of the radar system.

In some implementations, the one or more digital processing operations are performed such that the performance of the one or more digital processing operations does not overlap performance of a substantive portion of the one or more RF operations.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
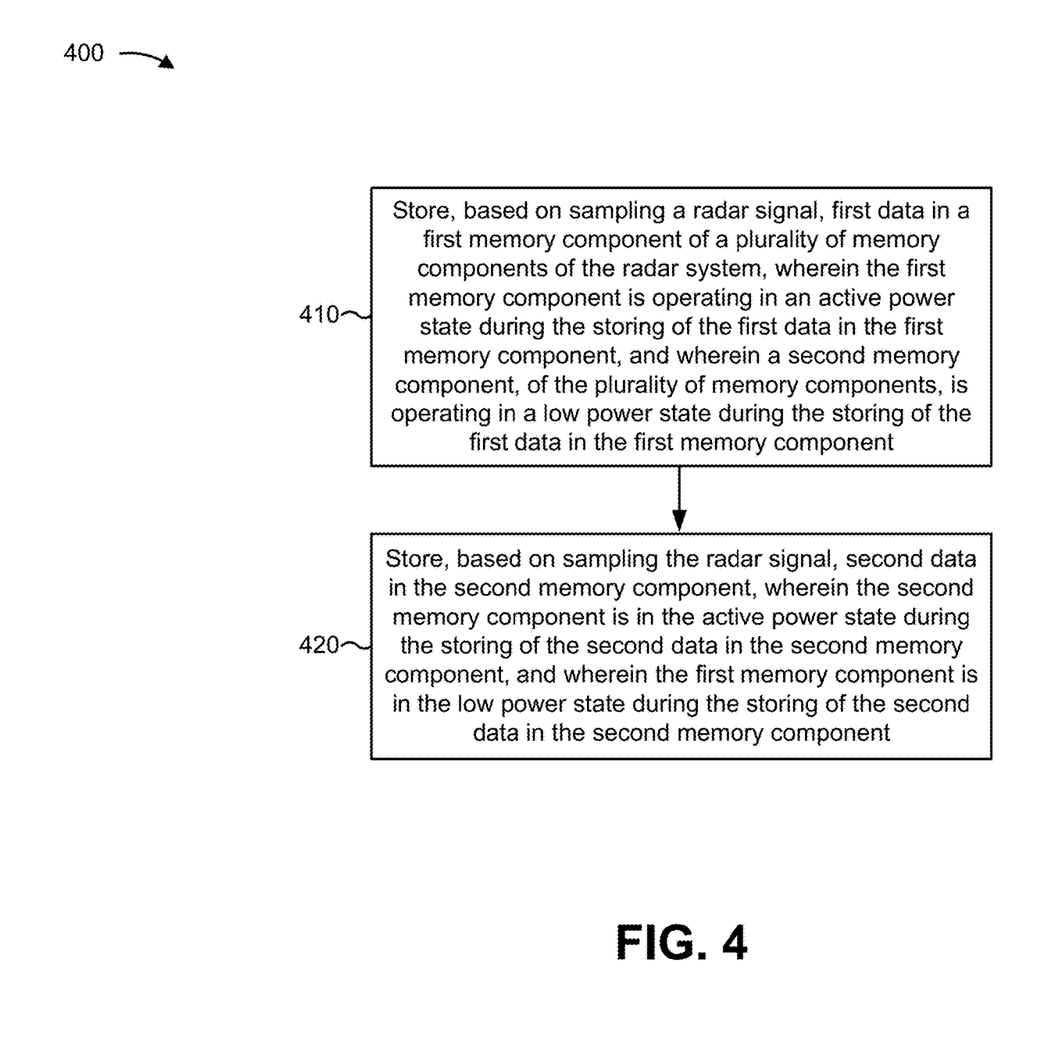
FIG. 4 is a flow chart of an example process associated with memory power state switching for an improved radar system.

FIG. 4 is a flow chart of an example process 400 associated with memory power state switching for an improved radar system. In some implementations, one or more process blocks of FIG. 4 may be performed by one or more components of a radar system (e.g., radar system 100).

As shown in FIG. 4, process 400 may include storing, based on sampling a radar signal, first data in a first memory component of a plurality of memory components of the radar system (block 410). For example, the radar system (e.g., using a set of analog components, such as radar IC 104, memory 106, and/or one or more other components in RF domain 102) may store, based on sampling a radar signal, first data in a first memory component of a plurality of memory components of the radar system, as described above. In some implementations, the first memory component (e.g., a first memory buffer of memory 106) is operating in an active power state during the storing of the first data in the first memory component. In some implementations, a second memory component (e.g., a second memory buffer of memory 106), of the plurality of memory components, is operating in a low power state during the storing of the first data in the first memory component.

As further shown in FIG. 4, process 400 may include storing, based on sampling the radar signal, second data in the second memory component (block 420). For example, the radar system (e.g., using a set of analog components, such as radar IC 104, memory 106, and/or one or more other components in RF domain 102) may store, based on sampling the radar signal, second data in the second memory component, as described above. In some implementations, the second memory component is in the active power state during the storing of the second data in the second memory component. In some implementations, the first memory component is in the low power state during the storing of the second data in the second memory component.

Process 400 may include additional implementations, such as any single implementation or any combination of implementations described below and/or in connection with one or more other processes described elsewhere herein.

In some implementations, the radar system may cause the first memory component to operate in the low power state after the storing of the first data in the first memory component.

In some implementations, the radar system may cause the second memory component to operate in the active power state prior to the storing of the second data in the second memory component.

In some implementations, the radar system may store, based on sampling the radar signal, third data in a third memory component of the plurality of memory components. Here, the third memory component (e.g., a third memory buffer of memory 106) is operating in the active power state during the storing of the third data in the third memory component, and the third memory component is operating in the low power state during the storing of the first data in the first memory component and during the storing of the second data in the second memory component. In some implementations, the first memory component and the second memory component are operating in the low power state during the storing of the third data in the third memory component.

In some implementations, the storing of the first data and the storing of the second data are performed during an active radar phase of the radar system.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide a radar system 100 capable of on-chip noise reduction and reduced power consumption. In some implementations, radar system 100 may include a set of analog components (e.g., components in RF domain 102) capable of performing one or more RF operations, and a set of digital components (e.g., components in digital processing domain 108) capable of performing one or more digital processing operations. In some implementations, radar system 100 is configured such that the one or more digital processing operations are performed without overlapping performance of a substantive portion of the one or more RF operations, thereby preventing noise generated in digital processing domain 108 from adversely impacting the one or more RF operations in RF domain 102 and, as a result, improving performance of radar system 100.

In some implementations, power to the set of analog components is supplied by a low noise power supply during performance of the one or more RF operations. Here, a high efficiency power supply of radar system 100 may be deactivated during the performance of the one or more RF operations. However, power to the set of digital components may be supplied by the high efficiency power supply during performance of the one or more digital processing operations. This power supply switching reduces noise experienced by the set of analog components during the performance of the RF operations, and reduces an amount of power consumed and an amount of heat generated by radar system 100.

In some implementations, power consumption can be further reduced by causing one or more memory components (e.g., one or more memory buffers of memory 106) to operate in a low power state (e.g., when not in use). As described above, operation of at least some of the memory components in the low power state reduces overall power consumption and, therefore, reduces heat generated by radar system 100.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A radar system, comprising:
    a set of analog components to perform one or more radio frequency (RF) operations during an active radar phase of the radar system; and
    a set of digital components to perform one or more digital processing operations during at least a digital processing phase of the radar system,
        wherein the one or more digital processing operations are performed such that performance of the one or more digital processing operations does not overlap performance of a substantive portion of the one or more RF operations,
        wherein the set of analog components is supplied by a first power supply, associated with a first noise power, during performance of the one or more RF operations, and
        wherein the set of digital components is supplied by a second power supply, associated with a second noise power higher than the first noise power, during performance of the digital processing operations.

2. The radar system of claim 1, wherein the one or more digital processing operations are not performed during an entirety of the active radar phase.

3. The radar system of claim 1, wherein the one or more digital processing operations are at least partially performed during non-substantive portions of the one or more RF portions.

4. The radar system of claim 1, wherein the radar system is a single chip system.

5. The radar system of claim 1, wherein a power to the set of digital components is supplied by the second power supply during performance of the one or more digital processing operations.

6. The radar system of claim 1, wherein the one or more digital processing operations include an operation associated with at least one of:
    an algorithm associated with determining a distance,
    an algorithm associated with determining a velocity,
    an algorithm associated with determining an acceleration,
    an algorithm associated with determining a direction of arrival,
    detecting an object,
    tracking an object, or
    communicating a digital communication.

7. The radar system of claim 1, wherein the substantive portion of the one or more RF operations is a portion of the one or more RF operations that defines digital signals that are to be processed during the performance of the one or more digital processing operations.

8. The radar system of claim 1, wherein the set of analog components is not supplied by the second power supply during the performance of the one or more RF operations.

9. The radar system of claim 1, wherein the set of analog components is powered by the second power supply during the performance of the one or more digital processing operations by the set of digital components.

10. A radar system, comprising:
    a set of analog components to perform one or more radio frequency (RF) operations during operation of the radar system,
        wherein power to the set of analog components is supplied by a first power supply during performance of the one or more RF operations,
        wherein a second power supply of the radar system is deactivated during
    the performance of the one or more RF operations; and
    a set of digital components to perform one or more digital processing operations during the operation of the radar system,
        wherein power to the set of digital components is supplied by the second power supply during performance of the one or more digital processing operations,
        wherein a noise power of the second power supply is higher than a noise power of the first power supply.

11. The radar system of claim 10, wherein the set of digital components is powered by the first power supply during the performance of the one or more RF operations by the set of analog components.

12. The radar system of claim 10, wherein the set of analog components is powered by the second power supply during the performance of the one or more digital processing operations by the set of digital components.

13. The radar system of claim 10, wherein the first power supply is a linear power supply.

14. The radar system of claim 10, wherein the second power supply is a switched mode power supply.

15. The radar system of claim 10, wherein the one or more RF operations are performed during an active radar phase of the radar system, and the one or more digital processing operations are performed during at least a digital processing phase of the radar system.

16. The radar system of claim 10, wherein the one or more digital processing operations are performed such that the performance of the one or more digital processing operations does not overlap performance of a substantive portion of the one or more RF operations.

17. A method, comprising:
    storing, by a radar system and based on sampling a radar signal, first data in a first memory component of a plurality of memory components of the radar system,
        wherein the first memory component is operating in an active power state during the storing of the first data in the first memory component, and
        wherein a second memory component, of the plurality of memory components, is operating in a low power state during the storing of the first data in the first memory component; and
    storing, by the radar system and based on sampling the radar signal, second data in the second memory component,
        wherein the second memory component is in the active power state during the storing of the second data in the second memory component, and
        wherein the first memory component is in the low power state during the storing of the second data in the second memory component.

18. The method of claim 17, further comprising:
    causing the first memory component to operate in the low power state after the storing of the first data in the first memory component.

19. The method of claim 17, further comprising:
    causing the second memory component to operate in the active power state prior to the storing of the second data in the second memory component.

20. The method of claim 17, further comprising:
    storing, by the radar system and based on sampling the radar signal, third data in a third memory component of the plurality of memory components,
        wherein the third memory component is operating in the active power state during the storing of the third data in the third memory component,
        wherein the third memory component is operating in the low power state during the storing of the first data in the first memory component and during the storing of the second data in the second memory component, and
        wherein the first memory component and the second memory component are operating in the low power state during the storing of the third data in the third memory component.

21. The method of claim 17, wherein the storing of the first data and the storing of the second data are performed during an active radar phase of the radar system.

* * * * *